United States Patent Office 3,217,682
Patented Nov. 16, 1965

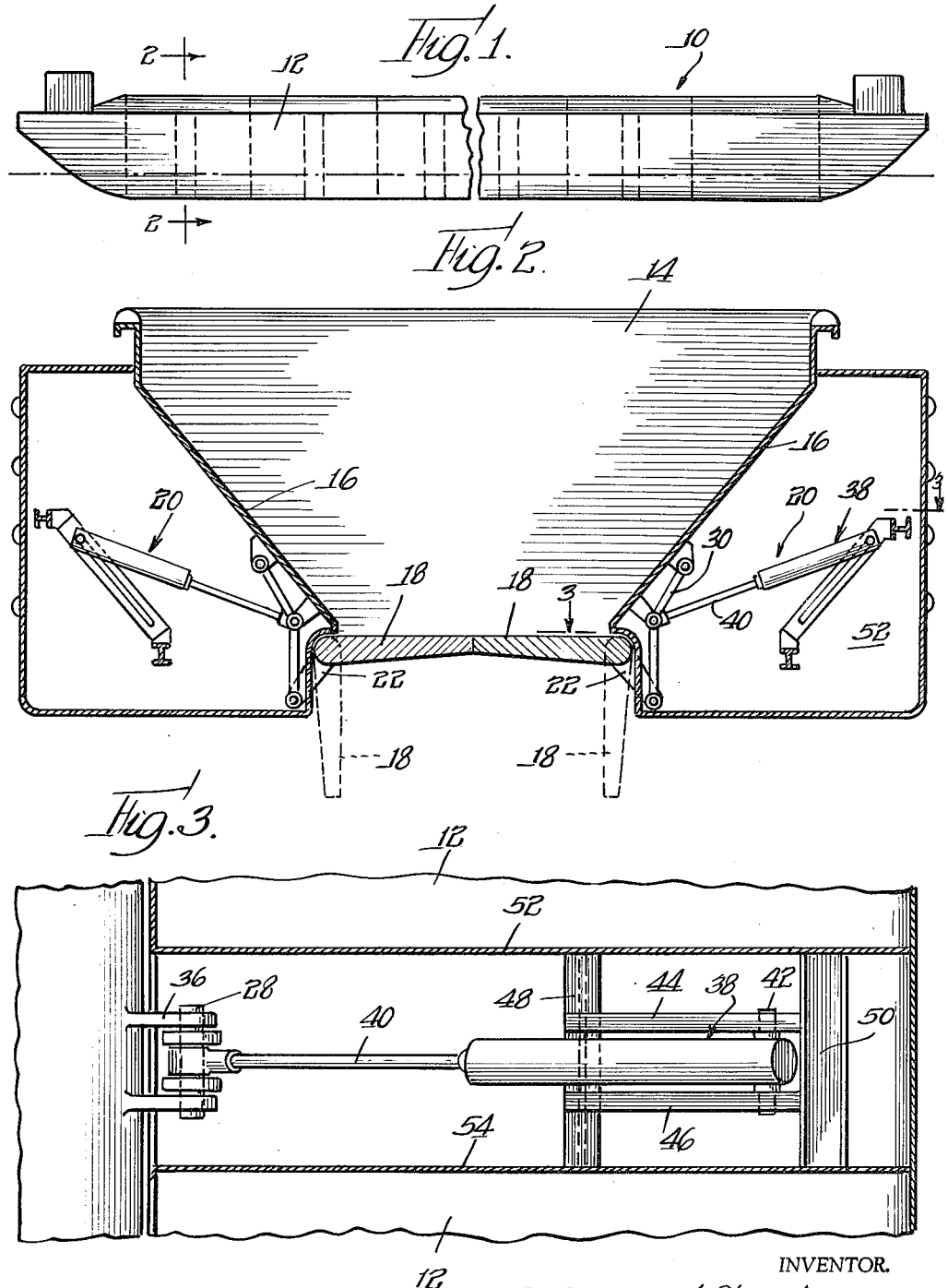

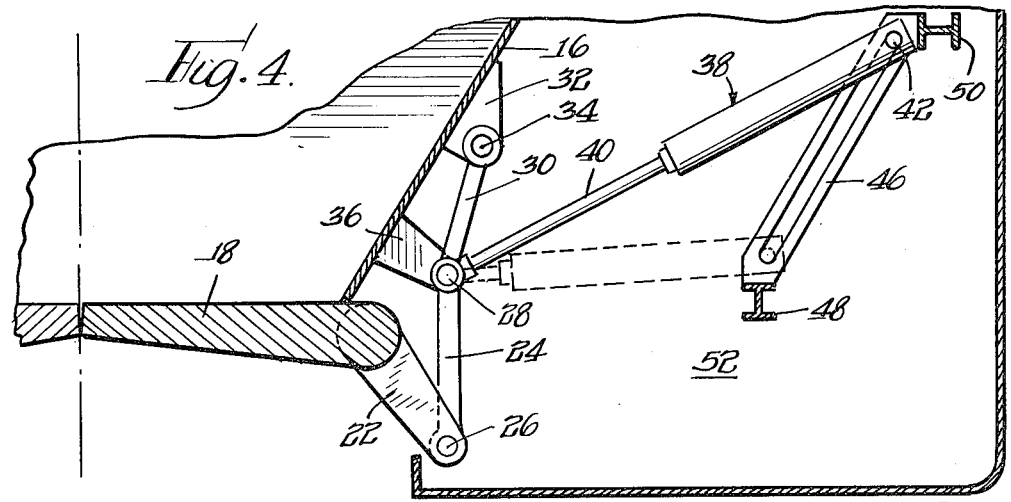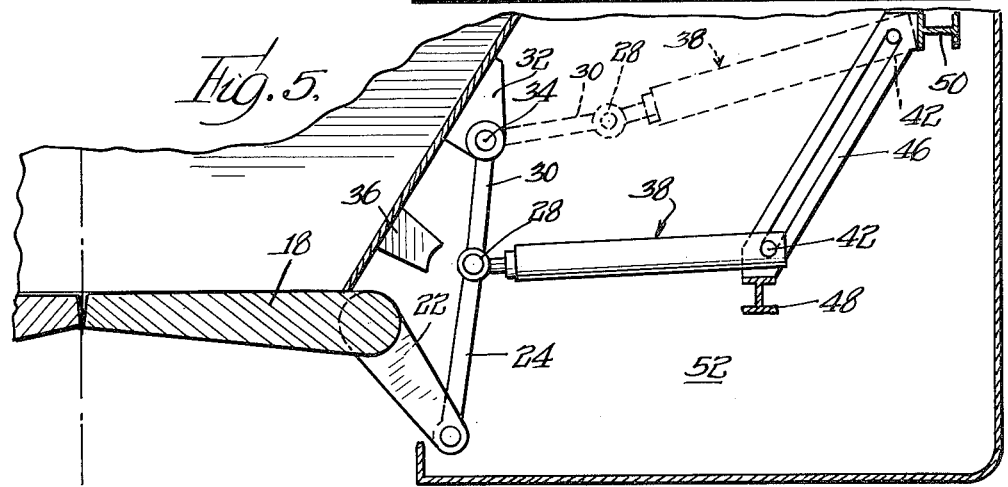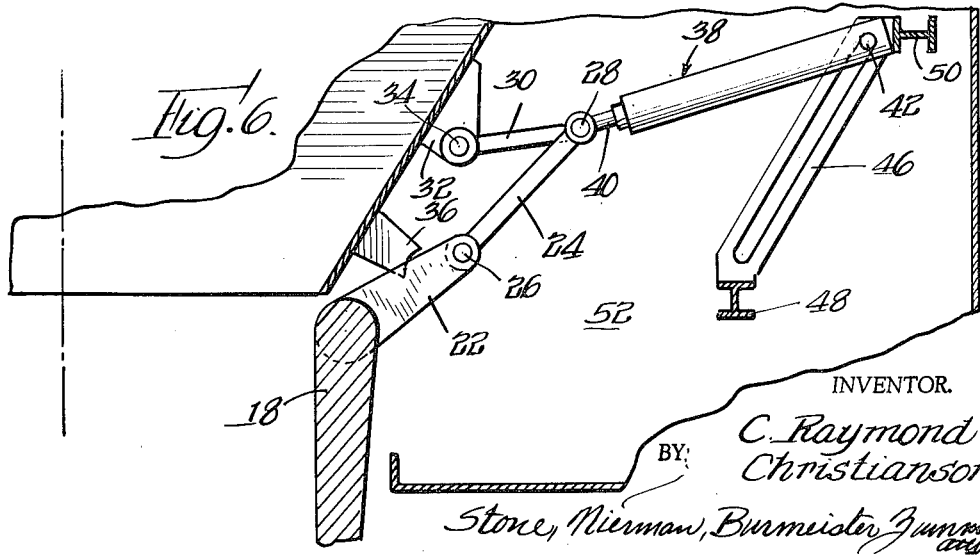

3,217,682
DUMP SCOW
Carl Raymond Christianson, 915 Michigan St.,
Sturgeon Bay, Wis.
Filed Jan. 7, 1963, Ser. No. 249,866
8 Claims. (Cl. 114—36)

This invention relates to an improved construction for a dump scow and, more particularly, to an improved construction for a quick operating gate control for a gate at the bottom of a hopper of a dump scow to open the gate quickly.

Dump scows are generally used for a variety of purposes. In all instances, cargo is loaded into a hopper of a dump scow from the top of the hopper. The scow is usually towed to an appropriate place and gates in the bottom of the hoppers of the scow are opened so that cargo falls out the bottom of the hopper. Numerous systems are presently in use for opening the gates and dumping the contents of the scow. The various systems employ chains, ratchets, gears and other control devices. All of these devices have a common failing; that is, they open slowly so that the material in the scow is not discharged quickly. Thus the dumping of material is not accurate because the scow may and often does drift as the material is being dumped. It is therefore one of the principal objects of the herein-disclosed invention to provide a dump scow construction in which cargo carried in the hoppers of the scow may be dumped quickly.

It is another object of the present invention to provide a control for a gate of a hopper which control is simple in construction, having a high degree of reliability and yet allows a quick action by the gate to provide quick dumping of cargo in the hopper.

It is a further object of the herein-disclosed invention to provide a gate control for a dump scow which gate control is self-locking which provides for locking of the gate in a closed position and the gate is held closed by the weight of the gate and the cargo on the gate.

It is a still further object of the herein-disclosed invention to provide a hopper gate control for a dump scow in which a gate may be opened quickly and from a remote point.

Other objects and uses of the herein-disclosed invention will become readily apparent to those skilled in the art upon a perusal of the following specification in light of the accompanying drawings, in which:

FIGURE 1 is a side elevation of a dump scow embodying the herein-disclosed invention;

FIGURE 2 is a cross-sectional view taken on line 2—2 of FIGURE 1 showing a hopper with gates controlled by devices embodying the herein-disclosed invention;

FIGURE 3 is a cross-sectional view taken on line 3—3 of FIGURE 2;

FIGURE 4 is a partial cross-sectional view of an enlarged portion of one of the control devices shown in FIGURE 2 showing a position of the instant device holding a gate in a closed attitude and a fluid power cylinder in a second position in dotted form showing the attitude of the cylinder prior to opening of the gate;

FIGURE 5 is identical to FIGURE 4 but with the device in its attitude immediately prior to opening of the gate and a second position of a link and the cylinder in dotted form illustrating their positions when the gate is in an open attitude; and FIGURE 6 is identical to FIGURE 5 but with the gate shown in a fully open attitude.

Referring now to the drawings and especially to FIGURE 1, a dump scow generally indicated by numeral 10 is shown therein. The dump scow is generally conventional in construction in that it includes a plurality of water-tight side tanks 12 which serve to buoy up the scow. Between the side tanks 12 is a plurality of hoppers 14 such as that shown in FIGURE 2. Each of the hoppers is conventional in construction in that it has sloping side walls 16 with a pair of gates 18 pivotally mounted at the bottom of the side walls and each gate pivots about a fixed pivot. A gate control mechanism embodying the present invention and generally indicated by numeral 20 is positioned between each pair of side tanks and is connected to its respective gate 18. Each of the control mechanisms 20 is identical in construction to the other control mechanism 20 and each mechanism controls its respective gate 18.

As was mentioned above, each of the gates 18 is pivotally mounted at the lower portion of its respective hopper. Each of the gates has fixed thereto a gate arm 22. The gate arm, as is evident in FIGURES 4 through 6, is spaced at an obtuse angle relative to gate 18. Thus, the gate arm also pivots about the same fixed pivot point as the gate.

The gate arm 22 has attached to its free end one end of a floating link 24 by means of a pin 26 so that the arm and the link are connected to each other at a connecting pivot. The other end of the floating link 24 is pivotally connected to a floating pivot pin 28. The floating pivot pin 28 is also pivotally connected to one end of a pivot link 30 so that floating link 24 and pivot link 30 are connected through a floating pivot point. The floating link 30 is connected to a gudgeon 32 by means of a pin 34. The gudgeon is in turn fixed to the hopper wall 16 so that the pivot link 30 pivots about a second fixed pivot point. A stop 36 is fixed to the outside of the hopper wall 16. It may be seen in FIGURE 4 that when the gate 18 is in an up position, the connecting pivot between the gate arm 22 and the floating link 24 and the fixed pivot of pivot link 30 at pin 34 determines a straight line and the stop 36 is inward of the straight line along with the floating pivot.

Connected to the floating pivot at pin 28 is a fluid power cylinder and more specifically, a hydraulic cylinder 38. The cylinder is connected to a conventional source of hydraulic power through conventional means and controlled by conventional valving none of which is shown herein. In this instance, the hydraulic cylinder 38 has a piston pivotally connected to the pivot pin. A slide pin 42 is fixed to the opposite end of the cylinder at one end of its tube. The pin is slideably mounted in a pair of slides 44 and 46. The slides 44 and 46 each have a slot which slideably receives the slide pin 42. The slides are fixed to I-beams 48 and 50 which I-beams are in turn fixed to bulkheads 52 and 54 of side tanks on opposite sides of the control device.

The operation of the instant device is simple. Looking now specifically to FIGURE 4, it may be seen how the gate is positioned when it is in its up or closed attitude. When the gate is up and when the hopper is filled with any particular cargo, there is a load on the gate 18 tending to pivot it about its fixed pivot point, that is, in a counterclockwise position as viewed in FIGURE 4. Inasmuch as arm 22 is fixed to the gate, there is a tendency to pivot arm 22 also in a counterclockwise position. This force pushes against floating link 24, so that pin 28 is held in tight engagement with stop 36. Thus, pivot link 30 is also held adjacent to stop 36. It is evident that the greater the load on gate 18, the greater the force to push the pin 28 against the stop.

When it is desired to open the gate, the operating cylinder 38 quickly and conveniently opens the gate. Looking the FIGURE 4, the cylinder is shown in an extended position. In order to open the gate the piston rod 40 is retracted so that the cylinder slides down the slides 44 and 46 to assume the attitude shown in dotted form. That is, the axis of the cylinder is perpendicular to the floating link 24. It is evident that all of the cylinders may be controlled by valves, and by appropriate arrangement of piping a pair of cylinders operating gates for the same hopper may be controlled simultaneously or all the cylinders or any combination thereof may be controlled simultaneously. It is readily apparent that the effect of the load on the gate 18 is to place the links 24 and 30 into compression. After the cylinder has been activated to retract the piston rod and the cylinder reaches the bottom of the slide and a force is supplied internally to the cylinder to further retract the rod, a force is applied to the pin 28 to pivot the link 30 about pin 34 and its second fixed pivot and to pivot the floating link 24 about pin 26 to pivot it relative to the gate arm 22. Once the pin 28 and the floating pivot passes outside the line extending from the fixed pivot of pivot link 30 to the pivotal connection of the floating link and the gate arm there is virtually no resistance to the pivoting of the gate 18 about its pivot axis. Thus, the cylinder 38 is pushed up into the position shown in phantom view in FIGURE 5. It is readily apparent that there is virtually no resistance to the opening of the gate once the opening commences. The only resistance which the gate encounters to opening is the resistance of the gate against the water and the frictional forces involved in the sliding of pin 42 in its slides 44 and 46 and the friction between the various links and the respective pins.

The closing of the gate 18 is as simple as the opening. In order to close the gate, it is necessary to apply pressure within the cylinder 38 to extend the rod 40. As may be seen in FIGURE 6, which shows the gate in a completely open position, the pin 28 remains below a line extending from the pivot point of pivot link 30, that is, pin 34, to the uppermost pivot point of cylinder 38. Thus, as the cylinder is energized and the rod 40 extends, the pivot link 30 pivots downward or clockwise as viewed in FIGURE 6. The gate arm 22 also rotates clockwise about its pivot point to move the gate 18 clockwise and into an up position. When the cylinder 38 is extended into a fully extended attitude such as that shown in FIGURE 4, the pin 28 has passed the line extending between the centers of pin 26 and pin 34, so that, the weight of gate 18 holds the pin 28 into engagement with stop 36, thus keeping gate 18 in a locked attitude in the up position. At this time, the pressure may be relieved from cylinder 38; that is, cylinder 38 may be completely de-energized and the gate remains in a locked position while in the up position.

It is readily apparent that by use of well-known conventional controls it would be possible to operate all of the gates on the barge either simultaneously, individually or any particular combination by an appropriate valving and energizing and de-energizing of cylinders. Inasmuch as the valving and lines to hydraulic cylinders are well-known, none of these are described in detail or shown herein. It is also readily apparent that instead of using a hydraulic cylinder, a pneumatic cylinder may be used instead. It is also readily apparent that although the instant arrangement has been shown in connection with a dump scow, the present device has other numerous application.

Although a specific embodiment of the herein-disclosed invention has been shown and described in detail, it is to be expressly understood that there are various modifications and changes which may be made without departing from the spirit and scope of the present invention. In this vein, it is to be understood that the fluid power cylinder may be connected to the dump scow in any number of ways and still retain the same effect. It is to be expressly understood that the present invention is limited only by the appended claims.

What is claimed is:

1. In a dump scow having a plurality of side tanks for buoyancy and a plurality of hoppers between spaced side tanks for holding cargo in said hoppers, each of the hoppers having a pair of gates in the bottom thereof for retaining cargo in each of the hoppers, the improvement comprising an operating control device for each of the gates including, a gate arm fixed to the gate for pivoting about a first pivot point adjacent to the bottom of its respective hopper, an elongated floating link having one end pivotally attached to the gate arm at a pivot connection, a floating pivot pin being pivotally connected to the other end of the elongated floating link, a pivot link having one end pivotally attached to the floating pivot link and the other end pivotally attached to a gudgeon, said gudgeon fixed to the outside of the respective hopper above the first fixed pivot, a fixed stop mounted on the outside wall of the respective hopper and inside of a line extending from the gudgeon to the pivot connection between the gate arm and the floating link when the gate is in an up position to close the bottom of the hopper for holding the gate in an up position by the weight of the gate holding the floating pivot pin in engagement with the stop, and an elongated fluid power cylinder having one end pivotally connected to the floating pivot pin for removing the floating pivot pin from engagement with the stop and moving it outside of said line extending between the gudgeon and the pivot connection to allow the weight of the gate to pivot the gate downward and the pivot link upward for quick opening of the hopper.

2. In a dump scow having a plurality of special side tanks for buoyancy and a plurality of hoppers between side tanks for holding cargo in said hoppers, each of the hoppers having a pair of gates in the bottom thereof for retaining cargo in each of the hoppers, the improvement comprising a quick opening operating control device for each of the gates including, a gate arm fixed to its respective gate for pivoting about a first fixed pivot point adjacent to the bottom of its respective hopper, an elongated floating link having one end pivotally attached to the gate arm at a pivot connection, an elongated pivot link having one end pivotally attached to the other end of the floating link to form a floating pivot and the other end pivotally attached to a second fixed pivot on the outside of its respective hopper above the first fixed pivot, a fixed stop mounted on the outside wall of the respective hopper and inside of a line extending from the second fixed pivot point to the pivot connection between the gate arm and the floating link when the gate is in an up position to close the bottom of the hopper for holding the gate in an up position by the weight of the gate, an elongated fluid power cylinder having one end pivotally connected to the floating pivot, and an upward sloping slide fixed to the scow and pivotally slideably receiving the other end of the cylinder, whereby the gate in an up position is moved to a down position by actuating the fluid power cylinder to move the floating pivot outward from the stop and outward past the line between the second fixed pivot point and the pivot connection between the gate arm and the floating link to allow the weight of the gate to provide the force to continue rotation of the gate downward about the first fixed pivot point while the cylinder is slid upward up the slide to completely open the gate.

3. In a dump scow having a plurality of side tanks for buoyancy and a plurality of hoppers between spaced side tanks for holding cargo in said hoppers, each of the hoppers having a pair of gates in the bottom thereof for retaining cargo in each of the hoppers, the improvement comprising a quick opening operating control device for each of the gates including, a gate arm pivotal about a fixed pivot point fixed to said scow and being operably connected to its respective gate to control said gate, a floating link having one end pivotally connected to the gate arm, a pivot link having one end pivotally connected to the other end of the floating link at a floating pivot point, the other end of the pivot link pivotal about a second fixed pivot point, a fixed stop engageable with the floating pivot point to hold the pivot link in one direction on one side of a line passing through the second fixed pivot point and the connecting point of the gate arm and the floating link, and a fluid power cylinder having on end pivotally connected to the floating link to disengage the floating pivot point from the fixed stop to allow the gate to open by gravity.

4. A gate control to provide quick opening of a gate comprising, a gate arm fixed to a gate and pivotal about a first fixed pivot point, a floating link having one end pivotally connected to the gate arm at a connecting point, a pivot link having one end pivotally connected to the other end of the floating link at a floating pivot point and the other end of the pivot link pivotal about a second fixed pivot point, a fixed stop engageable with the floating pivot point to hold the pivot link in one direction on one side of a line passing through the second fixed pivot point and the connecting point of the gate arm and the floating link, and a fluid power cylinder connected to the pivot link to move the floating pivot point away from the fixed stop past said line when the gate is in an up position to allow the gate to move to a down position by gravity.

5. In a dump scow having a plurality of hoppers for holding cargo in said hoppers, each of the hoppers having a gate in the bottom thereof for retaining cargo in each of the hoppers, the improvement comprising an operating control device for each of the gates including, a gate arm fixed to its respective gate and being pivotal about a first pivot point, a floating link having one end pivotally connected to the gate arm, a pivot link having one end pivotally connected to the other end of the floating link at a floating pivot point, said floating link having a greater distance from the point connecting it to the gate arm to the floating pivot point than the distance of the gate arm from the first pivot point to the point connecting the floating link to the gate arm, said pivot link having its other end pivotal about a second fixed pivot point, the distance between the second fixed pivot point and the floating pivot point being less than the distance between the floating pivot point and the point of connection between the floating link and the gate arm, a fixed stop on one side of a line passing through the second fixed pivot point and the connecting point of the gate arm and the floating link limiting pivoting of the pivot link in one direction to retain the gate in a position for retaining cargo in its respective hopper, and a fluid power cylinder being pivotally connected to the floating pivot point to pivot the floating pivot point away from the fixed stop to allow the weight of the gate to pivot the pivot link about the second fixed pivot point for a quick opening of the gate.

6. In a dump scow having a plurality of hoppers for holding cargo in said hoppers, each of said hoppers having a gate in the bottom thereof for retaining cargo in the hopper, the improvement comprising an operating control device for each of the gates including, a gate arm pivotal about a first fixed pivot point and being operably connected to a gate to control said gate, a floating link having one end pivotally connected to the gate arm, a pivot link having one end pivotally connected to the other end of the floating link at a floating pivot point and the other end of the pivot link pivotal about a second fixed pivot point, a fixed stop releaseably connectable to the pivot link to hold the pivot link in one direction, a fluid power cylinder having one end pivotally connected to the floating pivot point, and a sloping slide slideably and pivotally receiving the other end of the fluid power cylinder, said slide having its lowest point substantially level with the floating pivot point when the gate is in an up attitude to position the cylinder at substantially a right angle to the floating link and having its uppermost end above a line determined by the second fixed pivot point and the floating pivot point when the gate is in its down position.

7. In a dump scow having a plurality of hoppers, each of said hoppers having a gate in the bottom thereof for retaining cargo therein, the improvement comprising an operating control device for each of the gates including, a slide mounted on said scow extending upwardly and outwardly, a pivot pin slideably mounted in said slide for sliding and pivoting therein, a fluid power cylinder having one end fixed to said pin, a second pivot pin being pivotally connected to the other end of the fluid power cylinder, a stop fixed to an outside wall of the respective hoper and being engageable with the second pivot pin, a pivot link having one end pivotally connected with the second pivot pin, said pivot link having its other end pivotally connected to a first fixed pivot, a floating link having one end pivotally connected to the second pivot pin, said floating link having its other end pivotally connected to a third pivot pin, a gate arm having one end pivotally connected to the third pivot pin and the other end fixed to its respective gate for pivoting about a second fixed pivot point, whereby the gate in an up position holds the second pivot pin in engagement with the stop to hold the gate in a locked position and the fluid power cylinder retracts the pin from engagement with the stop thereby allowing the weight of the gate to pivot the gate and thus pivot the gate arm and slide the first pivot pin in its slide to move one end of the fluid power cylinder upward and outward to allow a quick opening of the gate.

8. A gate control to provide quick opening of a gate comprising, a gate arm pivotal about a first fixed pivot point and being operably connected to a gate to control said gate, a floating link having one end pivotally connected to the gate arm, a pivot link having one end pivotally connected to the other end of the floating link at a floating pivot point and the other end of the pivot link pivotal about a second fixed pivot point, a fixed stop positioned on one side of a line extending between the second fixed pivot point and a pivot point of the one end of the link and the gate arm when the gate is in a closed attitude, said fixed stop being connectable to the pivot link to hold movement of the pivot link in one direction when the gate is in a closed attitude and the pivot link urged toward the fixed stop by the weight of the gate and the gate arm tending to pivot the pivot link toward the fixed stop, and a fluid power cylinder connected to the pivot link for disconnecting the pivot link from the fixed stop and moving the pivot link past said line to pivot the gate arm for operating the gate.

References Cited by the Examiner

UNITED STATES PATENTS

| | | | |
|---|---|---|---|
| 758,135 | 4/1904 | Harrison | 105—240 |
| 1,063,284 | 6/1913 | Reid | 114—36 |
| 1,290,572 | 1/1919 | Test | 105—299 |

FOREIGN PATENTS 11,873    1903    Great Britain.

FERGUS S. MIDDLETON, *Primary Examiner.*

MILTON BUCHLER, *Examiner.*